Jan. 26, 1971  D. A. ROBERTS  3,557,537

DUST OR SAND SEPARATORS

Original Filed July 24, 1967

INVENTOR
DEREK AUBREY ROBERTS
BY

ATTORNEY

United States Patent Office 3,557,537
Patented Jan. 26, 1971

3,557,537
DUST OR SAND SEPARATORS
Derek Aubrey Roberts, Almondsbury, Bristol, England, assignor, by mesne assignments, to Rolls-Royce Limited, Derby, England, a British company
Continuation of application Ser. No. 655,621, July 24, 1967. This application Nov. 6, 1969, Ser. No. 871,610
Int. Cl. B01d 45/14
U.S. Cl. 55—306                                 4 Claims

ABSTRACT OF THE DISCLOSURE

Apparatus for separating sand, dust or other particulate matter from air including a ring of rotor vanes which lie within a ring of guide vanes and act on inwardly flowing dust laden air to concentrate the dust in a zone from which it is discharged.

---

Figure 1:
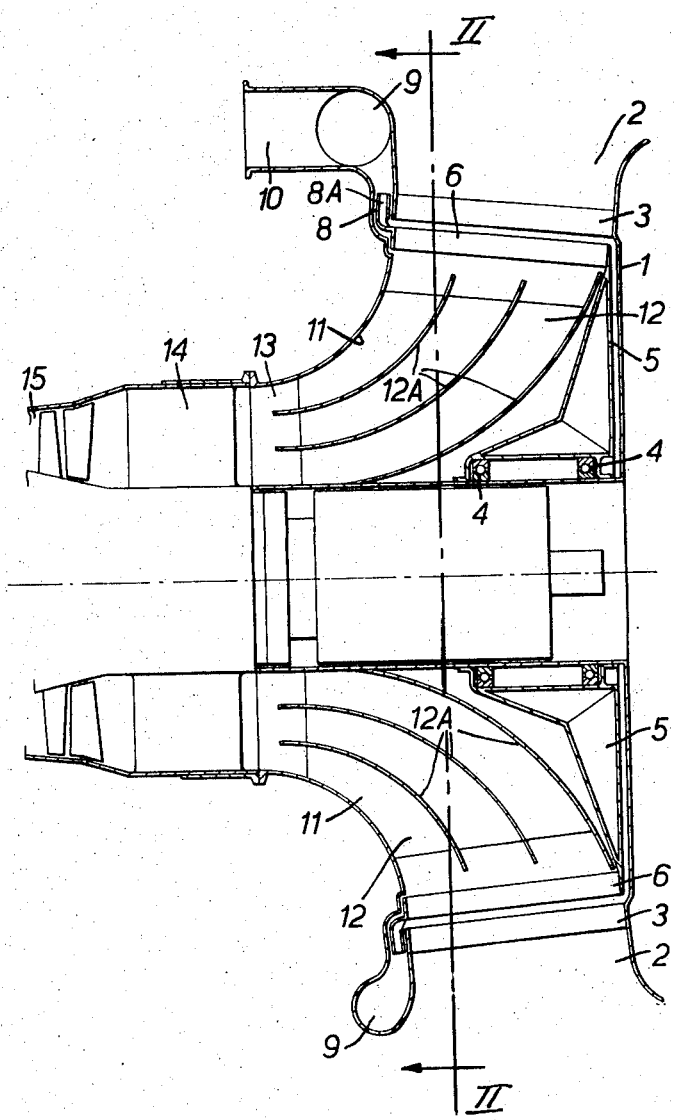

This application is a continuation of Ser. No. 655,621, filed July 24, 1967, now abandoned.

This invention relates to apparatus for separating dust, sand or other particulate matter from air and of the kind commonly called dust separators, in which the air to be cleaned, and hence any particulate matter in suspension in it, has rotary movement imparted to it so that the air and suspended particles are subject to centrifugal force which tends to separate the suspended particles from the air.

The invention is particularly but not exclusively applicable to the air intake systems of gas turbine engines arranged to drive the rotors of helicopters, in which case the purpose of the apparatus is to prevent dust, sand and other particulate matter raised from the ground by the action of the helicopter rotor or rotors or otherwise from entering the engine air intake or intakes.

For convenience herein it will be assumed that the air to be cleaned is laden with dust rather than sand or other particulate matter, and the term "dust" wll be used and is to be understood as including any particulate matter in suspension in air to be cleaned.

One form of apparatus of the kind referred to has been proposed in which the dust-laden air flows axially through a passage of circular cross-section containing a rotor which causes the air and any dust therein to rotate and the dust particles in the air therefore to migrate to and collect in the outer circumferential strata of the air, from which they are discharged through an annular outer dust-discharge passage, while the cleaned air flows through an inner passage surrounded by the outer dust-discharge passage. In such apparatus it will be apparent that the circumferentially extending layers of air which lie nearer to the axis of the rotor and hence to the axis of rotation of the dust laden air are subject to lower centrifugal force than the outer circumferential layers while moreover the dust in the inner circumferential layers of the dust laden air has to travel radially outwards across the stream of air in order to reach the outer circumferential strata and thus be discharged through the annular dust-discharge passage. At least a porportion of the dust lying initially in the inner circumferential strata of the dust laden air tends, therefore, to be swept into the inner passage and this tendency can only be reduced by increasing the length and/or diameter of the rotor and/or of the passage between the rotor and the adjacent ends of the inner passage and its surrounding annular dust-discharge passage and/or the speed of rotation of the rotor so as to apply greater centrifugal force to the dust and/or provide a longer period for the dust in the inner circumferential layers of dust laden air to migrate to the outer circumferential layers before the rotating air stream reaches the inlets respectively to the annular outer dust-discharge passage and the inner for cleaned air. These factors make the type of apparatus in question unsuitable for use or incapable of being used in many applications, where for example such apparatus having dimensions capable of providing an acceptable degree of dust separation cannot be accommodated or can only be accommodated with inconvenience.

It is an object of the present invention to provide air cleaning apparatus of the kind employing centrifugal force to separate dust from the air, which will tend to be more efficient than the previously proposed apparatus mentioned above and in which the disadvantages and limitations of such apparatus will be reduced or substantially eliminated.

To this end apparatus for separating dust from air according to the invention comprises a rotor provided with a plurality of vanes arranged to permit an inward flow therebetween of air to be cleaned, a plurality of guide vanes situated between the said rotor vanes and a source of such air, at least one discharge passage arranged to receive and discharge dust concentrated in a determined zone by rotation of the rotor vanes and a receiving and delivery passage for cleaned air situated inwardly of the rotor vanes.

The term "inward flow" used above is to be understood as meaning flow in a direction having a substantial inward radial component relatively to the axis of rotation of the rotor, while the term "inwardly" is similarly to be understood as referring to a position nearer to such axis of rotation than are the rotor vanes. References above and elsewhere herein moreover to inward radial flow are to be interpreted as referring to a direction generally toward the axis of rotation of the rotor and not as limited to flow necessarily along lines which intersect this axis.

Conveniently apparatus according to the invention for separating dust from air comprises a rotor provided with a ring of circumferentially spaced vanes arranged for inward radial flow of air therebetween, a ring of guide vanes which surrounds the ring of rotor vanes and is situated between said ring of rotor vanes and a source of air to be cleaned, a discharge passage situated adjacent to at least one end of the ring of rotor vanes to receive particulate matter separated from the air by the action of the rotor vanes, and a receiving and delivery passage for cleaned air situated immediately within the ring of rotor vanes.

Thus in apparatus according to the invention any dust in the inwardly travelling dust-laden air is acted upon by centrifugal force as it enters the spaces between the rotor vanes so that its inward travel is checked and the dust is thrown outwards into the circumferential zone immediately surrounding the ring of rotor vanes, from which zone it is discharged with a small proportion of air through one or more discharge passages, which are situated at a point or points adjacent to one or each end of the rotor and/or at a point or points within the length of the rotor.

In some cases the rotor might be driven, in which case it could by suitable choice of vane form act to some extent as a centripetal impellor to provide some pressure rise in the air stream delivered to the receiving and delivery passage.

Preferably, however, for simplicity, the rotor is arranged for free rotation and the guide vanes and the rotor vanes are formed so that rotation is imparted to the rotor by the impingement of the air directed on to its vanes by the guide vanes.

Thus in one preferred arrangement the guide vanes are curved so as to direct the air tangentially and the rotor vanes are substantially flat and lie in planes which contain or pass close to or intersect the axis of rotation of the rotor.

The particles which enter the spaces between the rotor vanes will tend to be thrown radially outwards by centrifugal force into the spaces between the guide vanes and then carried by the air stream back into the spaces between the rotor vanes several times. Each particle as it enters either of the spaces in question will moreover have a tangential component of movement in relation to the appropriate one of the two vanes bounding the space which it enters and, according to a preferred feature of the invention, the centre line of each of the guide vanes and/or the centre line of each of the rotor vanes extends in a direction having a circumferential component such, in relation to the direction of rotation of the rotor, that any particle thrown outwards by rotation of the rotor into a space between two guide vanes or carried inwards by the air stream into a space between two rotor vanes, and thus caused to impinge upon the surface of a guide vane or of a rotor vane as the case may be, will tend to be impelled by the reaction of the guide vane or rotor vane, thereon in a direction having a substantial axial component towards a discharge passage situated adjacent to the appropriate end of the ring of rotor vanes. It will be understood that with such an arrangement where, as is preferred, the longitudinal centre lines of the guide vanes and the longitudinal centre lines of the rotor vanes extend in directions having circumferential components, the circumferential component of the longitudinal centre line of the rotor vanes will be in the opposite sense from that of the longitudinal centre lines of the guide vanes.

Thus, in such arrangements the dust particles will tend to be bounced back and forth between the rotor vanes and the guide vanes towards the discharge passage, and it may be desirable to form the rotor vanes and guide vanes so that their longitudinal centre lines lie respectively on the surfaces of two concentric cones of small cone angle, that is to say so that the general external contours of the ring of rotor vanes and the ring of guide vanes are frustoconical with the larger diameter end of each frustum adjacent to the discharge passage, thus assisting in the bouncing action referred to.

When apparatus according to the invention is employed to clean air flowing to the air inlet of a gas turbine engine, the air receiving and delivery passage conveniently extends from the annular area adjacent to the inner edges of the rotor vanes in a combined inward radial and axial direction to the air inlet of the gas turbine and has a cross sectional area which diminishes progressively in the direction of air flow therethrough.

It will be understood that while the invention has been referred to above as comprising a ring of circumferentially spaced rotor vanes and an associated ring of guide vanes arranged as described in relation to a source of air to be cleaned, a dust discharge passage and a delivering passage for cleaned air, the rotor may comprise two or more such rings axially displaced from one another and each provided with a dust discharge passage adjacent to one or each of its ends, and that in this case one or more dust discharge passages which are common to and lie between two adjacent rings of rotor and guide vanes may be employed.

One construction of dust separating apparatus according to the invention as applied to a gas turbine engine is illustrated somewhat diagrammatically by way of example in the accompanying drawings, in which, FIG. 1 is a sectional side elevation in a plane containing the axis of rotation of the rotor of the apparatus and the centre line of the air inlet of the gas turbine.

Figure 2:
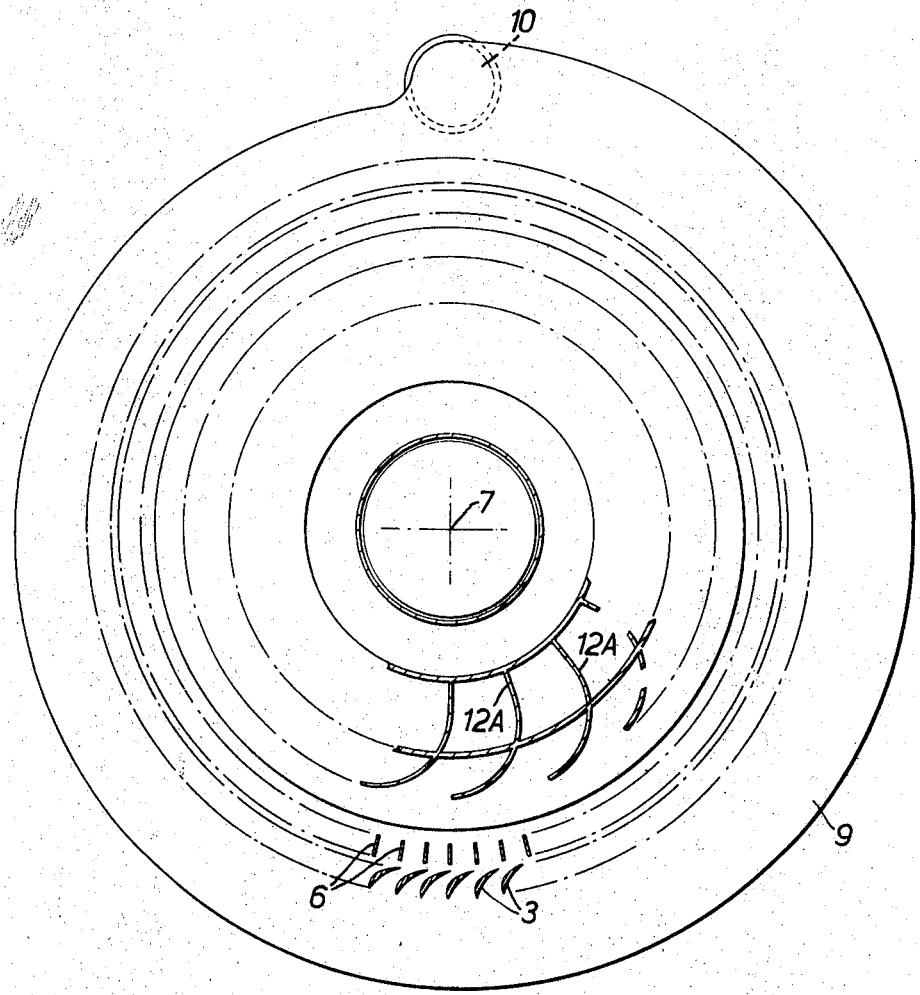
Figure 3:
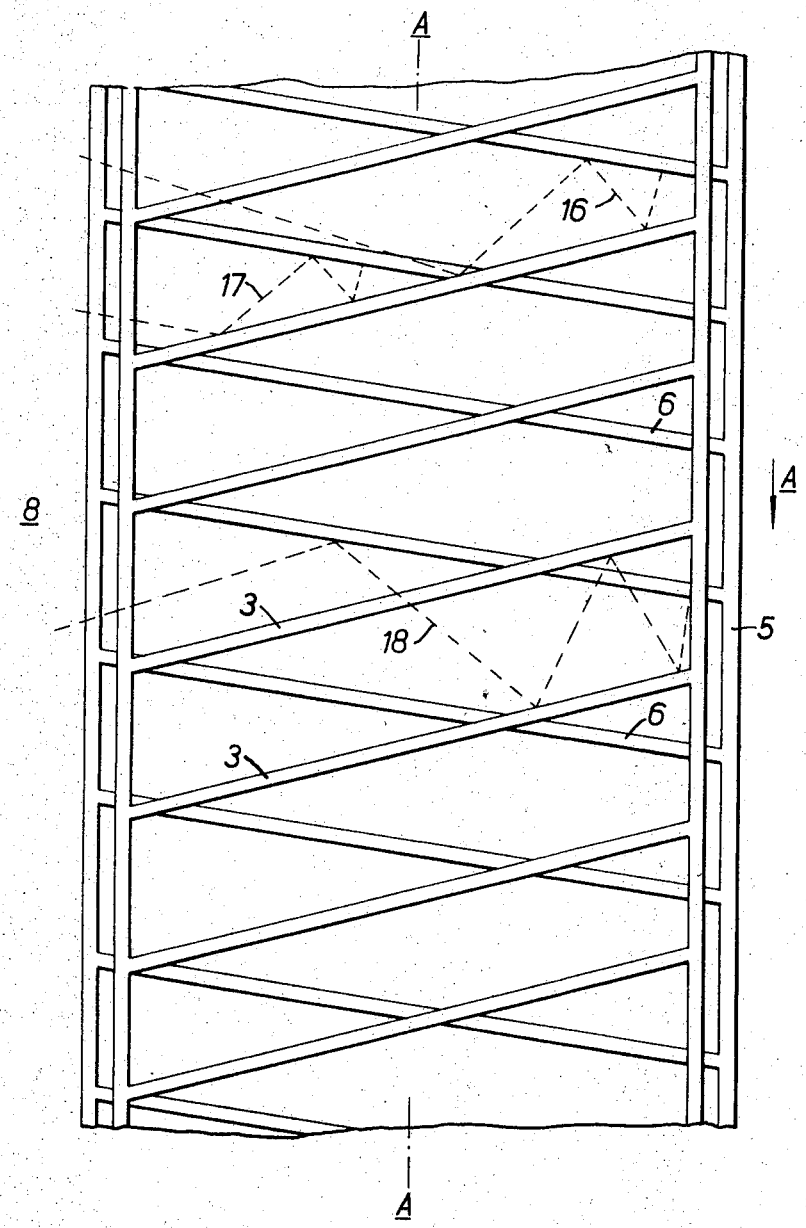

FIG. 2 is a view taken on the line II—II of FIG. 1 showing in cross-section the general forms of the guide vanes and the rotor vanes, and of straightener vanes which are provided in the air receiving and delivering passage, FIG. 3 is a diagrammatic view on a much enlarged scale of adjacent parts of the rings of rotor vanes and guide vanes illustrating how the inclinations of the longitudinal centre lines of the rotor and guide vanes to the direction of rotation, so that each extends in a direction having a circumferential component, urge the dust particles towards the discharge passage.

In the construction illustrated the air cleaning apparatus comprises a casing 1 formed with an annular air inlet 2 immediately surrounding a ring of axially extending guide vanes 3 of the general curved form shown in FIG. 2. Supported on bearings 4 within the casing 1 for rotation about the axis of the ring of guide vanes 3 is a rotor 5 provided with a ring of rotor vanes 6 lying immediately within the ring of guide vanes 3, each of the rotor vanes 6 being substantially flat as shown in FIG. 2 and lying in a plane intersecting the axis 7 of rotation of the rotor 5. Alternatively each of the rotor vanes 6 may lie in a plane which intersects the axis 7 at an angle.

As will be seen from FIG. 1, each of the rotor vanes 6, while being of rectangular form has its longitudinal centre line somewhat inclined to the axis of rotation 7 so that outer edges of the rotor vanes lie on the surface of an imaginary cone having a small cone angle and the general external form of the ring of rotor vanes is frustoconical, the longitudinal centre lines of the vanes of the ring of guide vanes 3 being correspondingly slightly inclined to the axis of rotation.

At the end of the ring of rotor vanes 6 at which the outer vanes lie most remote from the axis of rotation 7, there is provided on the rotor an annular dust-discharge passage 8 containing vanes, indicated at 8A, and arranged to discharge dust, with a small proportion of air into a dust-collecting passage 9 which is of volute form and has an exit passage 10. It will be appreciated that the vanes 8A act in the manner of a centrifugal fan to assist flow of air and accumulated dust into the dust-collecting passage 9.

As shown diagrammatically in FIG. 3 the longitudinal centre line of each of the rotor vanes 6 extends in a direction having a circumferential component such that the end remote from the discharge passage 8 is in advance (in the direction of movement) of the end adjacent to the discharge passage 8, while the longitudinal central line of each of the guide vanes 3 extends in a direction having a circumferential component in the opposite sense, for a purpose previously referred to and hereinafter explained more fully with reference to FIG. 3.

Formed within the casing 1 so as to lie immediately within the ring of rotor vanes 6 is an annular receiving and delivering passage 11 for clean air containing straightener and guide vanes 12, 12A and having a cross-sectional area which diminishes progressively in the direction of flow therethrough from its outer end immediately adjacent to the ring of rotor vanes 6 to its inner end 13 where it communicates with the inlet 14 of a gas turbine engine generally indicated at 15.

Thus, during operation the air compressor of the gas turbine engine 15 causes air to flow through the inlet 2 and the ring of guide vanes 3 by which it is directed tangentially onto the ring of rotor vanes 6 and thus causes rapid rotation of the rotor 5, with the result that any dust or sand particles in the air are caused by the action of the rotor vanes 6 to rotate within the ring of rotor vanes at approximately the speed of the rotor 5 and thus have imparted to them such centrifugal force that their inward travel is checked and slightly reversed so that they accumulate in the annular region adjacent to the outer edges of the rotor vanes 6 in spite of the inward flow of the air between these vanes, and travel along this region to the left in FIG. 1 into and through the dust discharge passage 8. Such travel may be assisted to some extent by the fact that the region in question in which the solid particles collect progressively increases in diameter from the right-hand end to the left-hand end in FIG. 1 so that centrifugal action tends to assist the travel of the dust or sand particles to the left.

The main factor assisting the travel is however the arrangement of the rotor vanes and guide vanes so that their longitudinal centre lines extend in directions having circumferential components as mentioned above and shown diagramatically in FIG. 3, in which the direction of rotation of the rotor (i.e. the direction of movement of the part of the ring of rotor blade shown) relative to the guide vanes is indicated by the arrow A.

As mentioned above in practice a large proportion of the particles of dust will on first entering the spaces between the rotor vanes be thrown back into the spaces between the guide vanes and then be carried back by the air stream into the spaces between the rotor vanes, and any given particle may be subjected to this treatment a number of times. It will be understood that during the period of each period when a particle lies between two rotor vanes it will be carried circumferentially around the ring of guide vanes before it again enters another space between two guide vanes, but, for convenience of diagrammatic illustration of the effect of the circumferential components of the directions in which the centre lines of the rotor vanes and guide vanes extend, it is assumed in FIG. 3 that dust particles are "bounced" back and forth between the parts of the two sets of vanes shown.

On this assumption the dotted lines 16, 17 and 18 show typical paths which dust particles may follow as they impinge alternately on rotor vanes and guide vanes, and it will be seen that the effect of the circumferential components referred to is to urge each particle towards the discharge passage 8. Moreover it will be seen that each "bounce" of a particle from the surface of a vane tends to give to the particle an increased component of axial movement towards the discharge passage as compared with any axial component of such movement which it may have acquired by a previous "bounce" or "bounces" and that the action thus tends to give to the particles which are initially furthest from the discharge passage the greatest mean velocity towards the discharge passage. It will be understood that the circumferential components of the directions in which the centre lines of the rotor vanes and guide vanes extend must not be such that any particles will be so deflected as to impinge on the back surfaces of the vanes, that is to say those surfaces which face away from the discharge passage.

The cleaned air from which dust has thus been extracted flows inwards through the receiving and delivering passage 11, during which flow it will have removed from it by the straightener and guide vanes 12, 12A at least the major portion of the rotational movement imparted to it by the rotor vanes 6. As will be seen the form of the straightener and guide vanes 12, 12A is such that the initial combined rotational and inward radial flow of the air tends to be smoothly converted into axial flow by the time the air reaches the air inlet 14 of the gas turbine 15.

It will be appreciated that, the radial dimensions of the rotor vanes 6 and their spacing should be such as to ensure that, having regard to the velocity of the air, any particles of dust or sand in the air will be acted upon by the rotor vanes to cause them to rotate, and thus be caused to accumulate in the area immediately adjacent to the outer edges of the rotor vanes, against the action of the inwardly radially flowing air, that is to say such that no particle can be swept into the delivering passage 11, due to its not being acted upon by one of the rotor vanes.

In a modification of the arrangement shown in the drawings and described above, instead of the longitudinal centre line of each rotor vane extending in a straight line throughout its length as indicated in FIG. 3 while the longitudinal centre line of each guide vane similarly extends in a straight line throughout its length, each rotor vane and each guide vane may be divided into two halves the centre line of one half extending in a direction with a circumferential component in one sense while the centre line of the other half extends in a direction having a circumferential component in the opposite sense, that is to say so that each rotor vane and each guide vane when viewed in the manner in which the vanes are presented in FIG. 3, is in the form of a wide angle V. The rotor vanes and guide vanes may then be regarded as each forming in effect two axially displaced rings of vanes with the rings which lie to the left of the central plane A—A in FIG. 3 being arranged so that the vanes urge dust particles to the dust discharge passage 8 at the left-hand end of the rotor while the rings which lie to the right of this plane urge dust particles to the right to a second dust discharge passage similar to the dust discharge passage 8 but disposed adjacent to the right hand ends of the vanes.

Alternatively the axially displaced rings of rotor vanes and guide vanes thus formed may be arranged so that they urge dust particles towards a common discharge passage situated adjacent to the plane A—A in FIG. 3, in which case again the construction may be regarded as comprising two dust separators according to the invention having a common dust discharge passage.

It will be understood that with such an arrangement if the edges of the vanes are inclined to the axis of rotation when viewed as in FIG. 1, the edges of the vanes in the rings on the two sides of the plane A—A would be inclined outwardly from this plane respectively towards the two dust discharge passages.

In any case such an arrangement in effect constitutes in effect the combination in a single strucutre of two dust separators each constituting dust separating apparatus according to the invention.

It will be apparent that with apparatus according to the invention all strata of the dust laden air are subject to approximately the same centrifugal action, and that should any solid particles which have been thrown outwards by centrifugal force into the annular area where dust collects be carried by the air stream back into the spaces between the rotor vanes, they will be subjected again to centrifugal action so as to be returned to the annular area in which the dust collects and from which the dust is discharged. It will also be seen that the total length in the direction of flow of the part of the air stream in which the dust is separated from the air can be short and yet substantially complete separation can be achieved.

In a further modified arrangement according to the invention which might otherwise be generally similar to that shown in FIGS. 1 and 2 the rotor 5 may be connected to the rotor of the gas turbine 15 by transmission mechanism so as to be positively driven at a rotational speed suitably related to that of the turbine rotor.

What is claimed is:

1. Apparatus for separating solid particles from air flowing through an inlet duct, comprising an outlet duct for air from which particles have been separated, a rotor rotatably mounted, a housing defining a flow path in the form of a figure of revolution connected to the outlet duct and enclosing the rotor, a radial inlet passage in the housing open to the periphery of the rotor, the rotor including a ring of spaced longitudinally extending rotor vanes lying at the peripheral part thereof defining a surface of revolution radially outward of the outlet duct, a ring of stator vanes secured to the housing across the inlet passage in a surface parallel with the said surface of revolution radially outward and upstream thereof, a portion of the housing defining an annular dust discharge passage in an end face of the housing and positioned adjacent the rotor vanes to face the rotor vanes at their ends adjacent the dust discharge passage, the rotor vanes extending obliquely to the axis of rotation for deflecting particles in the air towards, and expelling such particles through, said dust discharge passage, before the air has passed radially inside the rotor vanes to the outlet duct.

2. Apparatus as claimed in claim 1 wherein the rotor carries members in the dust discharge passage for giving particles entering the dust discharge passage a centrifugal component.

3. Apparatus as claimed in claim 1 wherein the said surface of revolution containing the rotor blades is frustoconical, the larger diameter being adjacent the dust discharge passage.

4. Apparatus as claimed in claim 1 wherein the stator vanes are oblique to the axis of rotation in a direction opposite to that in which the rotor vanes are oblique.

References Cited

UNITED STATES PATENTS

| | | |
|---|---|---|
| 2,338,779 | 1/1944 | Mutch. |
| 3,273,324 | 9/1966 | Jennings. |

FOREIGN PATENTS 363,566 11/1922 Germany.

FRANK W. LUTTER, Primary Examiner

B. NOZICK, Assistant Examiner

U.S. Cl. X.R.

55—406, 416; 60—39.09